United States Patent [19]

Ichihara et al.

[11] Patent Number: 4,832,980
[45] Date of Patent: May 23, 1989

[54] MAGNETO-OPTICAL RECORDING MEDIUM AND MANUFACTURING THEREOF

[75] Inventors: Katsutarou Ichihara, Tokyo; Nobuaki Yasuda, Zushi; Yoshiaki Terashima, Yokosuka; Senji Shimanuki, Atsugi, all of Japan

[73] Assignee: Kabushiki Kaisha Toshiba, Kawasaki, Japan

[21] Appl. No.: 90,395

[22] Filed: Aug. 27, 1987

Related U.S. Application Data

[62] Division of Ser. No. 784,563, Oct. 4, 1985, abandoned.

[30] Foreign Application Priority Data

Feb. 25, 1985 [JP] Japan .................. 60-35665

[51] Int. Cl.$^4$ .............................. G11B 7/24
[52] U.S. Cl. .................. 427/38; 204/192.2; 427/128; 427/129; 428/694; 428/900; 365/122; 369/13; 369/288
[58] Field of Search ........... 428/694, 900; 365/122; 369/13, 288; 360/131, 134, 135; 427/38, 128, 129; 204/192.2

[56] References Cited

U.S. PATENT DOCUMENTS

| | | | |
|---|---|---|---|
| 4,569,881 | 2/1986 | Fneese et al. | 428/213 |
| 4,615,944 | 10/1986 | Gardner | 428/332 |

FOREIGN PATENT DOCUMENTS

| | | |
|---|---|---|
| 0111988 | 6/1984 | European Pat. Off. |
| 0136574 | 10/1985 | European Pat. Off. |
| 3002642 | 8/1980 | Fed. Rep. of Germany |
| 3009978 | 9/1980 | Fed. Rep. of Germany |
| 2547445 | 12/1984 | France |
| 60-5442 | 7/1985 | Japan |
| 60-5443 | 7/1985 | Japan |

OTHER PUBLICATIONS

Digests of 7th Annual Conference on Magnetics in Japan, 1983-11, 9pA-6, Hando et al.

*Primary Examiner*—Paul J. Thibodeau
*Attorney, Agent, or Firm*—Oblon, Fisher, Spivak, McClelland & Maier

[57] ABSTRACT

According to a disk-shaped magneto-optical recording medium of the invention, a transparent thin film serving as an interference layer is formed on a transparent substrate. The thin film is subjected to a plasma surface treatment, thereby decreasing the fused oxygen content in at least a surface portion thereof. A recording layer of a rare-earth-transition metal amorphous ferrimagnetic alloy thin film is formed on the plasma surface-treated film. Since the content of active, fused oxygen contained in at least the surface portion of the film decreases, rare-earth element oxide can hardly be formed in a boundary region between the recording layer and the transparent thin film. The content of the rare-earth element in this region is smaller than the average content in the overall recording layer.

14 Claims, 9 Drawing Sheets

F I G. 3A
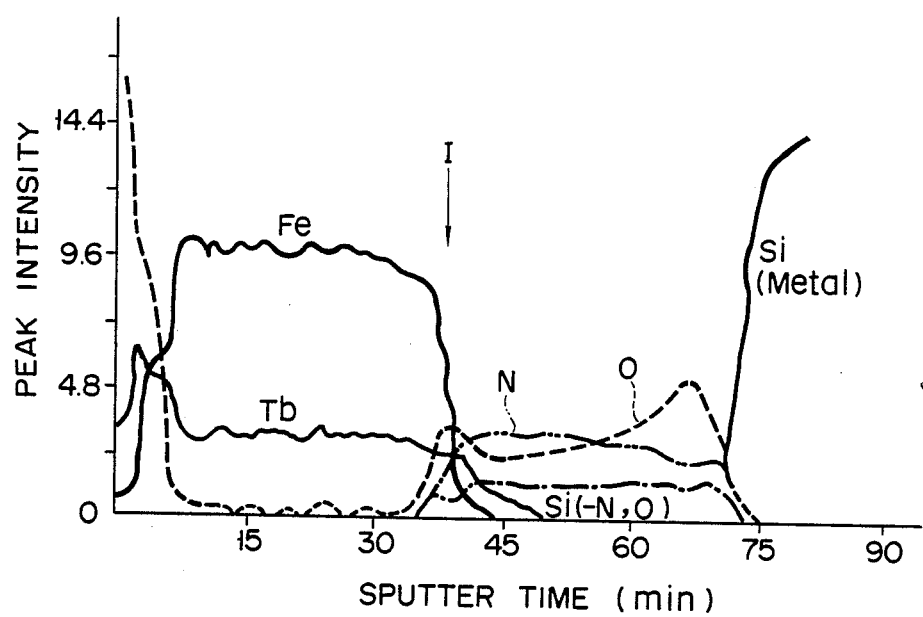
F I G. 3B
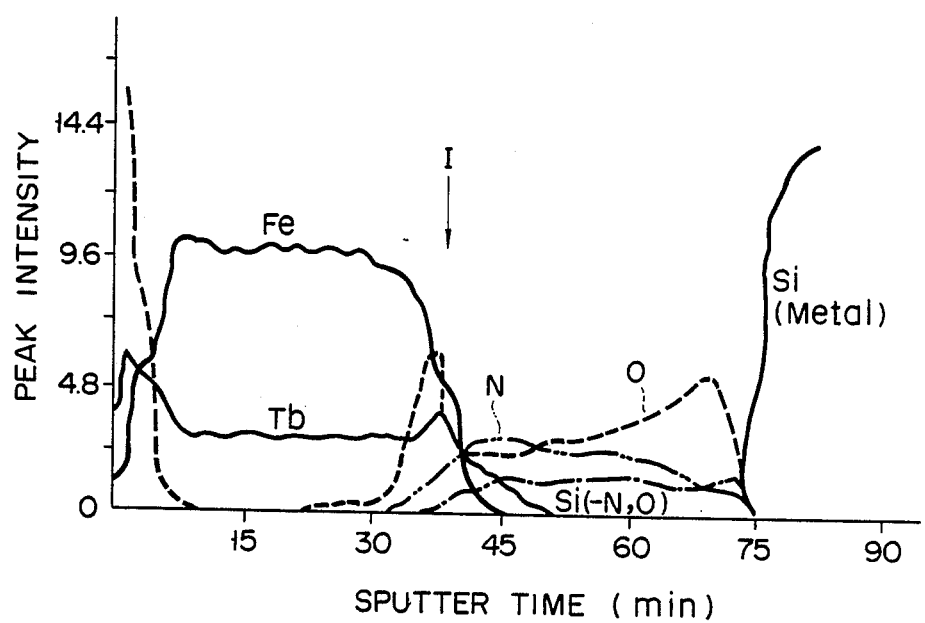

FIG. 4C
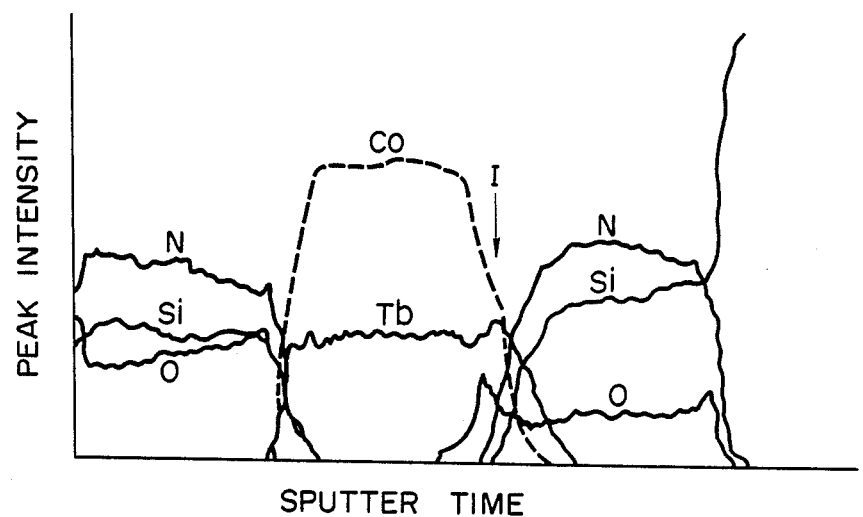
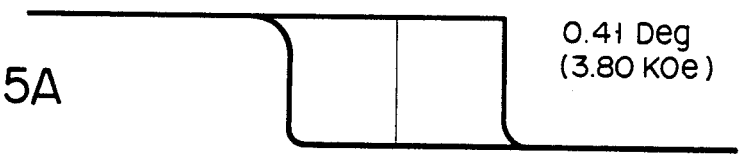
FIG. 5A
0.41 Deg
(3.80 KOe)
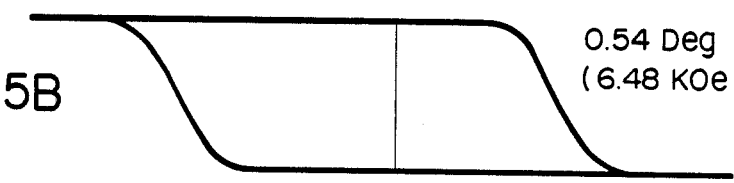
FIG. 5B
0.54 Deg
(6.48 KOe)
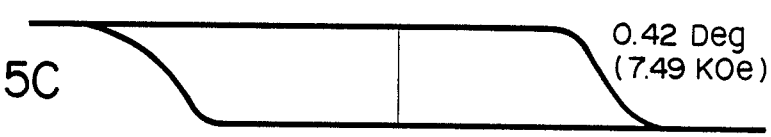
FIG. 5C
0.42 Deg
(7.49 KOe)

F I G. 6A
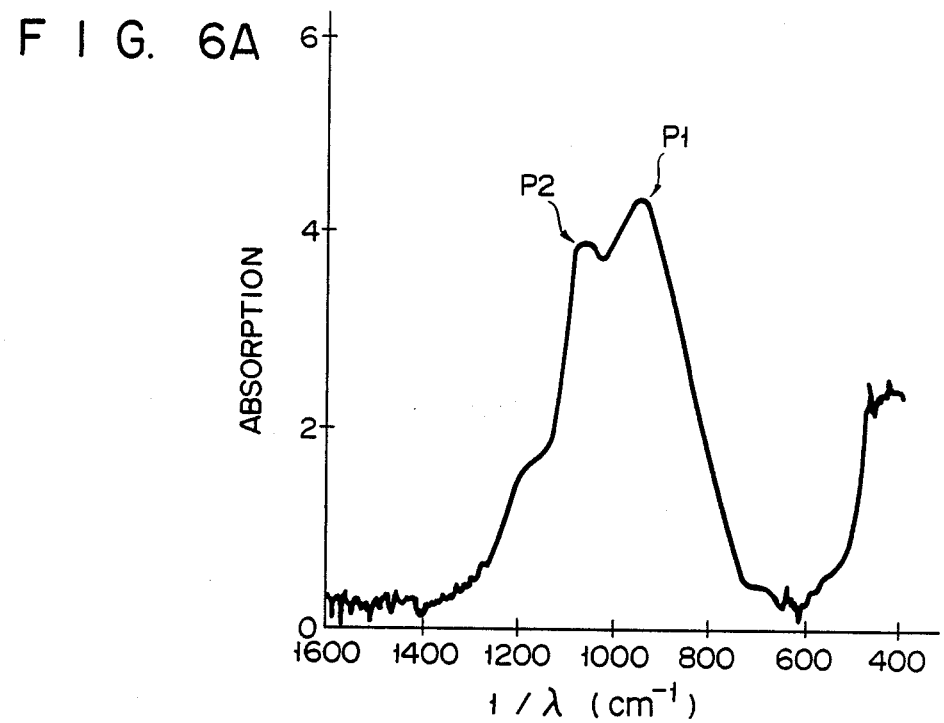
F I G. 6B
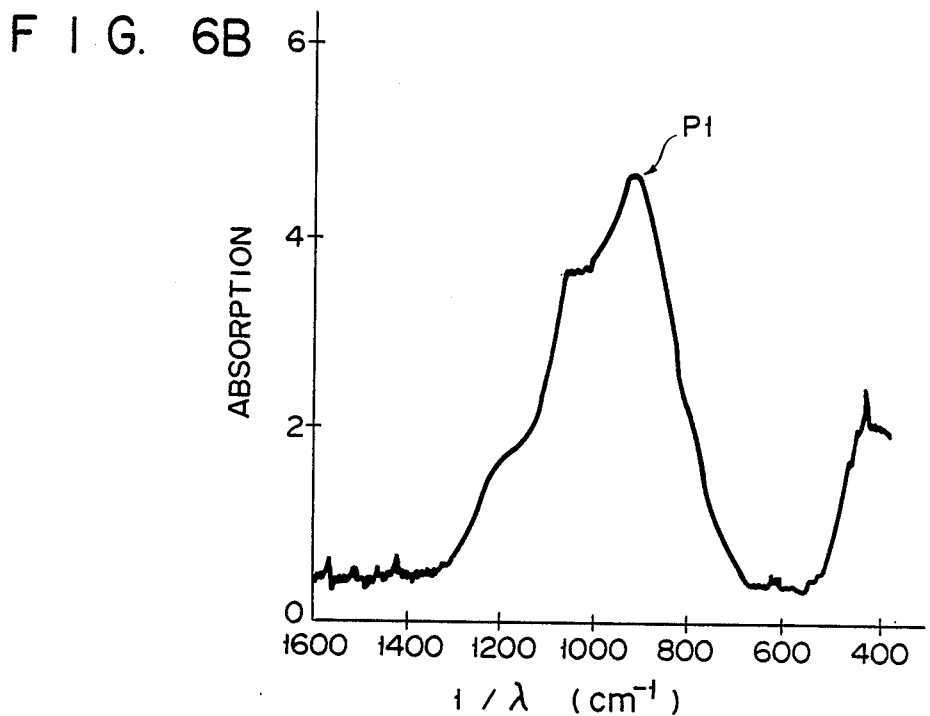

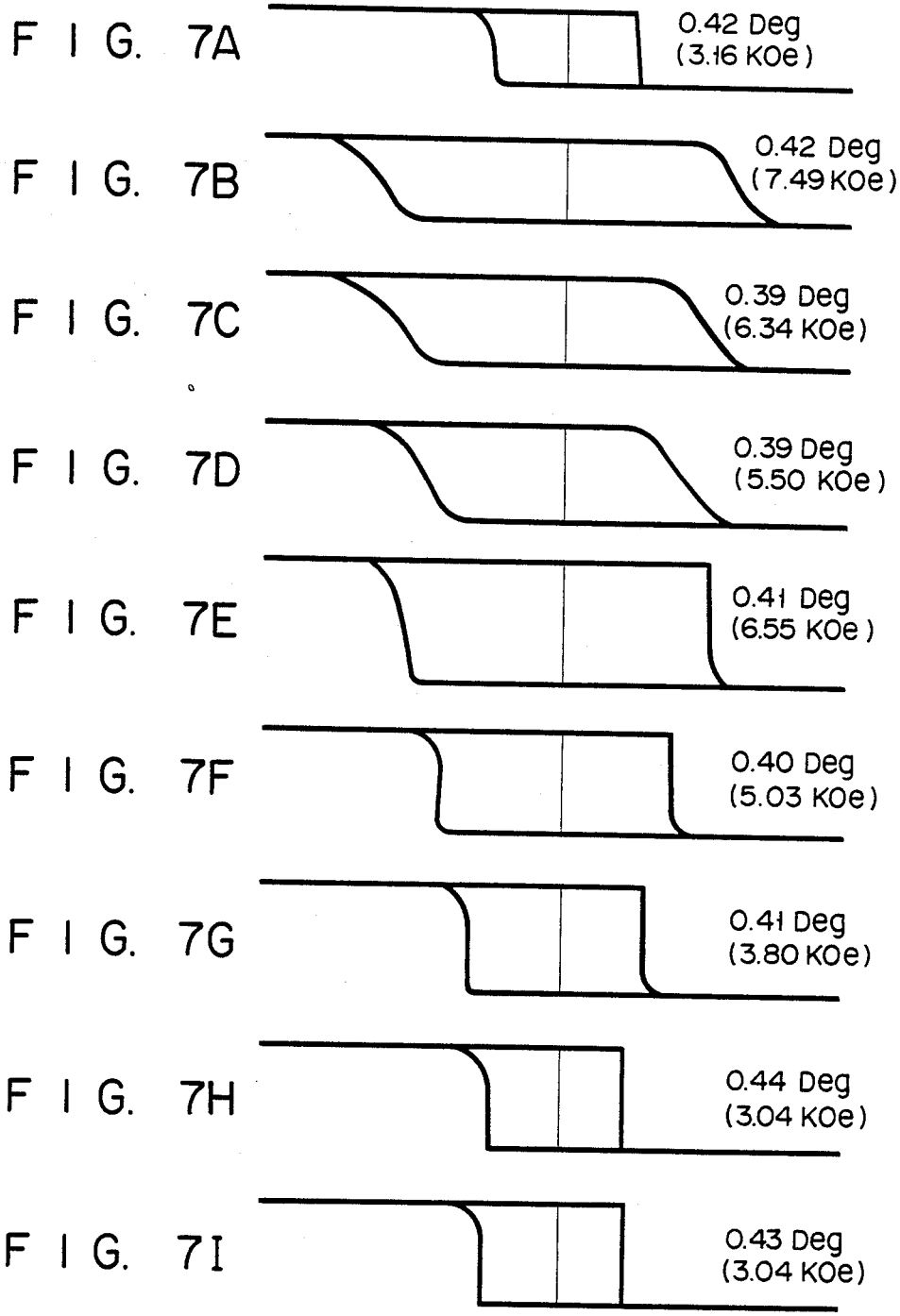

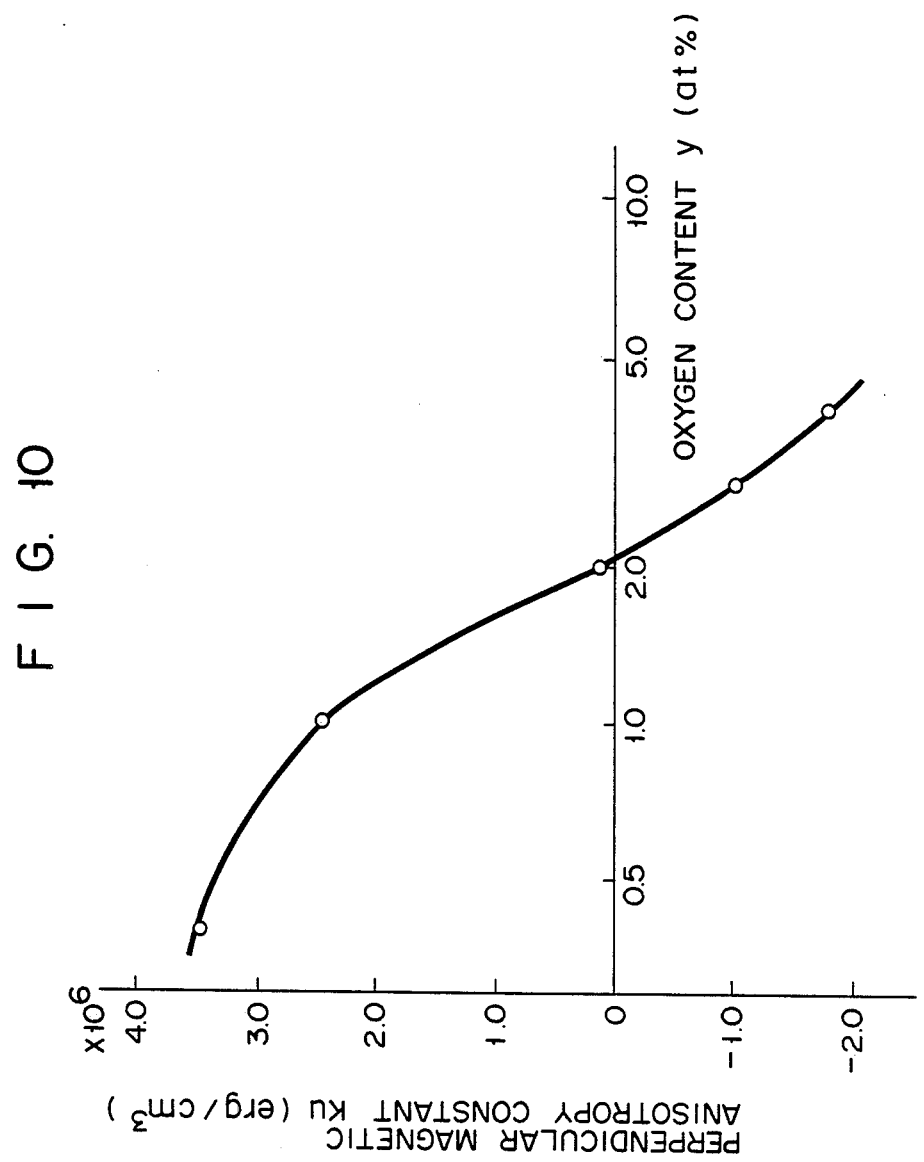

MAGNETO-OPTICAL RECORDING MEDIUM AND MANUFACTURING THEREOF

This application is a division of application Ser. No. 784,563, filed on Oct. 4, 1985, now abandoned.

BACKGROUND OF THE INVENTION

The present invention relates to a magneto-optical recording medium and, more particularly, to a magneto-optical recording medium having a recording layer made of a rare-earth-transition metal amorphous ferrimagnetic alloy having an axis of easy magnetization perpendicular to a surface of the recording film.

As a promising data-rewritable recording medium, an optical disk having a magneto-optical recording layer is now attracting much attention. A recording layer of the data-rewritable optical disk is made of a rare-earth-transition metal amorphous ferrimagnetic alloy (hereinafter called "RE-TM film"). When a recording magnetic field is applied to the recording layer and a laser beam is focused on the recording layer, the perpendicular magnetization in the RE-TM film is inverted in accordance with the light intensity, and bit data is magnetically stored. In order to read out storage data, the recording layer of the disk is irradiated with a DC-polarized reproduction laser beam. The data is read out by utilizing rotation of polarization plane of light transmission occurring in the recording layer In an optical disk having a recording layer comprising RE-TM film, the uniform recording layer can be relatively easily formed on a large-sized disk substrate using an industrially advantageous method of forming film forming such as sputtering or deposition. Since RE-TM film can be formed on a disk substrate without heating the substrate, a resin such as polymethylmethacrylate or polycarbonate can be employed as a substrate material.

Despite the above advantages, a recording layer comprising RE-TM film, can hardly achieve a sufficiently high carrier-to-noise ratio in data reproduction. This problem is due to a polar Kerr rotation angle of the RE-TM film itself not being sufficiently large.

In order to resolve the above problem, a transparent thin film is, conventionally, stacked on one surface of the RE-TM recording film, to which the reproduction light beam is applied. In general, the disk substrate of a recording medium of this type is transparent, and the reproduction light beam is applied to the recording film through the transparent substrate. Therefore, a transparent multi-interference layer is formed between the substrate and the RE-T recording film. The multi-interference layer increases the polar Kerr rotational angle of the RE-TM recording film. Thus, the carrier-to-noise ratio of the magneto-optical recording disk can be improved.

However, when a Kerr hysteresis characteristic of the magneto-optical recording disk having the multi-interference layer was actually determined, it was found that rise and fall of the hysteresis loop were moderate, and far from the ideal hysteresis loop shape (i.e., a rectangular shape in which rise and fall are sharp). This means that in the RE-TM recording film, magnetization inversion is slowly performed in accordance with a change in magnetic field H. When a magneto-optical recording medium having a recording film with such an irregular hysteresis loop is used as a memory, the storage bit data is changed. A stable data storage cannot be achieved.

SUMMARY OF THE INVENTION

It is therefore an object of the present invention to provide a new and improved magneto-optical recording medium which can effectively read/write data.

It is another object of the present invention to provide a new and improved magneto-optical recording medium which has an improved carrier-to-noise ratio in data reproduction, and at the same time, can store magnetically stable recording data.

According to the present invention, upon manufacture of a magneto-optical recording medium, when a transparent thin film serving as an interference layer is formed on a substrate, a surface treatment step is executed so that the amount of fused oxygen included in at least a surface portion of the transparent thin film is reduced.

The surface treatment step is realized in such a manner that:

the substrate having the transparent thin film is exposed, after the transparent thin film is formed, in a plasma gas atmosphere so as to stabilize fused oxygen contained in at least the surface portion of the transparent thin film by forcibly combining it with plasma ions; or fused oxygen contained in at least the surface portion of the transparent thin film is sputtered out, during the formation of transparent thin film, by plasma ions using a bias sputtering method so as to forcibly reduce an oxygen content in the transparent thin film.

The recording layer comprising a rare-earth-transition metal amorphous ferrimagnetic alloy thin film is formed on the transparent thin film subjected to the above surface treatment. Since a content of fused oxygen which is combined with a rare-earth element contained both in at least the surface portion of the transparent thin film and in the recording layer formed thereon is decreased, formation of a rare-earth element oxide in a film boundary region between the recording layer and the transparent thin film is suppressed or prevented. As a result, an increase in content of the rare-earth element in the film boundary region can be effectively prevented. In practice, it was experimentally confirmed that the content of the rare-earth element in this region was set to be less than the average content of the rare-earth element in the entire recording layer.

BRIEF DESCRIPTION OF THE DRAWINGS

The present invention is best understood by reference to the accompanying drawings, in which:

FIGS. 3A and 3B are graphs showing an Auger peak intensity measured by using a conventional disk and the magneto-optical recording disk manufactured in accordance with a method of the present invention including a plasma surface treatment step;

FIGS. 4A to 4C are graphs showing an Auger analysis result conducted for three different samples of the magneto-optical recording medium;

FIGS. 5A to 5C are graphs showing a polar Kerr hysteresis loop measured by using the above samples of the magneto-optical recording medium, FIGS. 6A and 6B are graphs showing infrared light absorption characteristics of the transparent thin films provided in the magneto-optical recording disks of the present invention and the conventional disk;

FIGS. 7A to 7I are graphs showing Kerr hysteresis loops of nine samples of another magneto-optical recording disk manufactured by varying processing power (RF power) in the plasma surface treatment;

FIG. 10 is a graph showing a dependence of a perpendicular magnetic anisotropy content Ku upon an oxygen content y of a sample of the magneto-optical recording disk in which a 50 nm thick $Si_xO_yN_z$ film, a 50 nm thick TbCo recording layer and a 50 nm thick $Si_3N_4$ film are sequentially formed on an Si substrate.

DETAILED DESCRIPTION OF THE PREFERRED EMBODIMENTS

Figure 1:
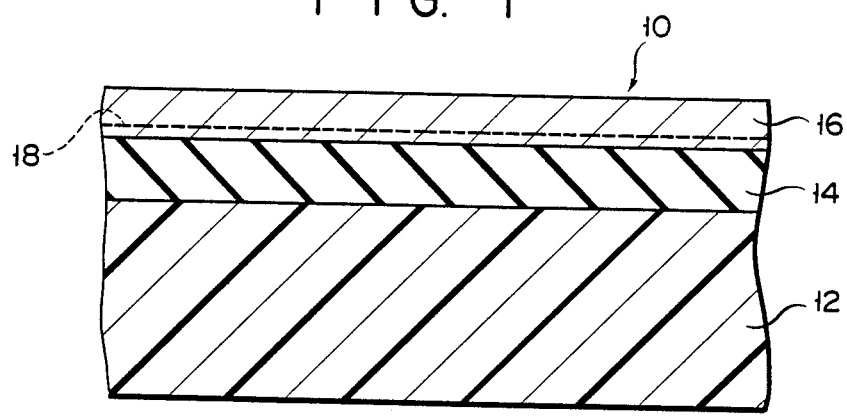
FIG. 1 is a sectional view showing a main part of a magneto-optical recording disk according to an embodiment of the present invention.

A basic structure of a magneto-optical recording medium according to one embodiment of the present invention will be explained with reference to FIG. 1. FIG. 1 illustrates a sectional structure (not drawn to scale) of a main part of a magneto-optical recording disk 10. A disk substrate 12 is made of a transparent material which allows a reproduction light beam to transmit therethrough. For example, the substrate 12 is made of a transparent resin such as an acryl, polymethylmethacrylate (PMMA) or the like. A transparent thin film 14 is formed on the substrate 12, and serves as a multi-interference layer. A recording layer 16 comprising a rare-earth-transition metal amorphous ferrimagnetic alloy thin film (RE-TM film) is formed on the film 14. The recording layer 16 comprises, e.g., a terbium-iron (TbFe) film. The film 14 provided between the substrate 12 and the layer 16 is made of, e.g., silicon nitride ($Si_3N_4$), and serves to increase a polar Kerr rotation angle of the layer 16, thereby improving a carrier-to-noise ratio of the magneto-optical recording disk.

Referring to FIG. 1, a broken line is used for visually indicating an interface region (film boundary region) 18 between the TbFe recording layer 16 and the underlying interference layer 14. According to this embodiment, it should be noted that a content of a rare-earth element (Tb) in the interface region 18 between the layers 16 and 14 is set to be smaller than that in the overall layer 16. In other words, a ratio of the content of the rare-earth element to that of a transition metal in the region 18 of the layer 16 is set to be smaller than the average content ratio of the rare-earth element to that of the transition metal in the layer 16 as a whole. As a result, the content of the rare-earth element in the region 18 of the layer 16 is smaller than in the other portion of the layer 16. The content of the rare-earth element is reduced in the interface between the layers 16 and 14 since formation of a rare-earth element compound (rare-earth element oxide) serving as a non-effective recording layer portion is suppressed in the interface region of the layer 16.

Basically speaking, a thickness of the region 18 having the smaller content of the rare-earth element (Tb) is preferably set to be equal to or smaller than 1/10 of the total thickness of the layer 16 (more preferably, 1/20 or less). For example, when the total thickness of the layer 16 is 50 nm, the thickness of the region 18 is set to be 5 nm or lower.

A method of manufacturing the magneto-optical recording disk having the above feature will be described. The acrylic substrate 12 is dipped in a neutral detergent solution so as to ultrasonically wash its surface. The washed substrate 12 is disposed in a sputtering chamber. The sputtering chamber is evacuated to a predetermined pressure, e.g., to about $2 \times 10^{-6}$ Torr A nitrogen-argon ($N_2$-Ar) gas mixture is introduced into the evacuated sputtering chamber to obtain a pressure of 5 mTorr. In this case, the partial pressure ratio of nitrogen is set to be 20%. A silicon nitride ($Si_3N_4$) plate is used as a sputtering target, and an $Si_3N_4$ film is formed on the substrate 12 by sputtering. This film is transparent, and corresponds to the above-mentioned interference layer 14.

After sputtering is completed, the chamber is evacuated again. Subsequently, Ar gas is introduced into the chamber to obtain a pressure of 5 mTorr. An RF power of, e.g., 100 W is applied to the substrate placed in the chamber. In this state, the transparent thin film 14 formed on the substrate is exposed to an argon plasma for a predetermined period of time (e.g., 5 minutes). Thus, a plasma surface treatment of the film 14 is completed. In this case, a self bias voltage having a negative polarity with respect to ground potential (e.g., −260 V) is simultaneously applied to the substrate 12. Note that in the experiment of the present inventors, the negative potential of the self bias voltage was measured by a high-voltage/high-frequency probe and a synchroscope.

After 5 minutes have elapsed during which the film 14 is exposed to Ar, the RF power source is turned off, and use of the $Si_3N_4$ target is interrupted. Instead, another target comprising a rare-earth-transition metal amorphous ferrimagnetic alloy, e.g., TbFe is used. When sputtering is continued in the above atmosphere using the TbFe target, a TbFe layer is formed on the film 14 serving as the interference film to a predetermined thickness, e.g., 100 nm. The layer serves as the above-mentioned recording layer 16.

As a feature of the present invention, after the film 14 is formed on the substrate 12, a step of subjecting the film 14 to the Ar plasma surface treatment is added in the process of the manufacturing method. After the film 14 is formed on the substrate 12, the film 14 is subjected to the plasma surface treatment, and oxygen (fused oxygen) contained in an exposed surface portion of the film 14 is forcibly combined with plasma ions by the impulse of the plasma ions so as to stabilize the exposed surface of the film 14. The layer 16 is deposited on the layer 14 wherein an oxygen content in the exposed surface portion thereof is forcibly reduced, so that the content of the rare-earth element Tb in the region 18 between the layers 14 and 16 can be set to be smaller than that in the other region of the layer 16. This is due to the following reason. Since the oxygen content in the exposed surface portion of the underlying layer 14 is reduced, formation of the rare-earth element oxide in the boundary region between the recording layer 16 and interference layer 14 can be suppressed or prevented.

In this case, a fused oxygen content of the underlying interference layer 14 is preferably set to be 2 atomic percent (at %) or less. If the oxygen content of the layer 14 exceeds this value, a non-effective recording layer is undesirably formed. The oxygen content of the layer 14 is also associated with a film thickness of the recording layer 16. Thus, when the oxygen content of the layer 14 is 2 at % or less, the recording layer 16 having good magnetic characteristics and a thickness of 50 nm or less can be obtained. FIG. 10 shows results of an experiment about characteristics of a perpendicular magnetic anisotropy constant Ku when the fused oxygen content of the layer 14 is changed. In the experiment, an underlying $Si_xO_yN_z$ film was formed by using an $Si_3N_4$ (high purity) target and $Ar-N_2-O_2$ gas mixture, and y was changed by changing an $O_2$ content in the gas mixture. The constant Ku was examined in such a manner that a 50 m thick TbCo film and an $Ar-N_2$ gas mixture sputter film of an $Si_3N_4$ target were sequentially formed on the $Si_xO_yN_z$ film. As is apparent from FIG. 10, when $y \leq 2$ at %, $Ku > 0$.

In this case, the Co-based recording layer 16 could provide good characteristics, but the Fe-based recording layer 16 had poor characteristics. Furthermore, when $y \leq 2$ at %, a thickness of the Fe-based recording layer 16 could not be decreased. In order to overcome such a drawback with respect to the Fe-based recording layer 16 and to provide a thin film, the oxygen content of the layer 14 must be decreased to 0.5 at % or less. Then, a thin Fe-based recording layer 16 having good characteristics can be formed and a thickness of 10 nm or less can be formed. Therefore, since the film thickness of the recording layer 16 can be decreased, the following effects can be obtained: (1) a Faraday effect can be obtained and a carrier-to-noise ratio in reproduction can be improved since light loss is small; (2) a recording sensitivity can be improved since heat loss during laser beam radiation is small; and (3) mass-production is facilitated.

In order to decrease oxygen contained in the layer 14, i.e., fused oxygen, another method is proposed in addition to the above method in which plasma ions are forcibly combined with oxygen in the interference layer 14. That is, when the layer 14 is formed, oxygen contained in the layer 14 is sputtered out by plasma ions utilizing the bias sputtering method so as to decrease the oxygen content in the layer 14. In this case, oxygen may be sputtered out during the exposed surface portion of the layer 14 is being formed. Oxygen contained in the layer 14 can be sputtered by sufficient bias sputtering during the overall period of the formation of layer. An area of a region of the layer 14 from which oxygen is sputtered out depends upon a sputter time and/or a sputter voltage. According to the present invention, the sputter voltage set for sputtering oxygen is within the range of $-50$ to $-700$ V, and more preferably, $-100$ to $-500$ V. The sputter voltage is set at, e.g., $-250$ V.

Figure 2A:
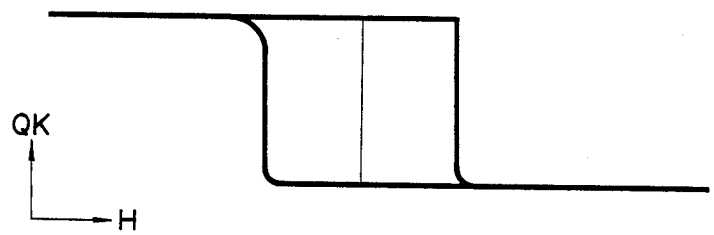
FIGS. 2A and 2B are graphs showing a Kerr hysteresis loop of the magneto-optical disk of FIG. 1 and a conventional disk.
Figure 2B:
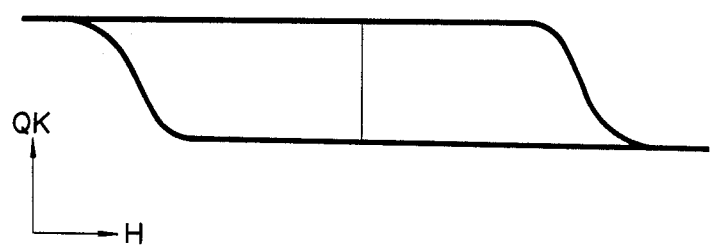

According to the magneto-optical recording disk manufactured in the above manner, the content of the rare-earth element in the region 18 between the layers 16 and 14 can be easily and effectively set to be smaller than the average content of the rare-earth element in the other region of the layer 16. As a result, a composition distribution along a direction of film thickness of the recording medium can be averaged, thus realizing a good polar Kerr hysteresis characteristic having steep rising and falling edges of the hysteresis loop desirable to record bit data. FIG. 2A shows a representative polar Kerr hysteresis characteristic of the disk of the present invention, and FIG. 2B shows that of the conventional disk for the sake of comparison. Waveforms of FIGS. 2A and 2B are drawn to the same scale, and the abscissa represents a magnetic field H and the ordinate represents a magnetization Qk. The Kerr hysteresis characteristic was measured by using an apparatus comprising a light source including an He-Ne laser, a polarizer and a light detector constituted by a Glan-Thompson prism, and an electromagnet which can invert its polarity. The laser beam was directly radiated on the recording layer of the magneto-optical recording disk through the polarizer. The reflected light from the recording layer was introduced into a light detection unit through the light detector so as to be detected.

As can be understood from FIGS. 2A and 2B, the magneto-optical recording disk according to the core idea of the present invention has an ideal hysteresis loop shape approximating to a rectangle as compared to the conventional disk, and magnetization in the recording layer is steeply inverted with respect to a change in external magnetic field H. It should be noted that a write/read beam is set so as to be radiated on the recording layer 16 from the side of the substrate 12 when data is written/read in/from the magneto-optical recording disk. However, if it is demonstrated that the disk of the present invention has a polar Kerr hysteresis characteristic superior to the conventional disk under the same measurement conditions when the laser beam is directly radiated on the recording layer, it is obvious to those skilled in the art that the disk of the present invention has a polar Kerr hysteresis characteristic superior to the conventional disk under the same measurement conditions even when the laser beam is indirectly radiated on the recording layer through the transparent substrate.

It was experimentally demonstrated that the above-mentioned effect of the present invention becomes notable when a thickness of the layer 16 is small. In the magneto-optical disk manufactured by the method of the present invention, it was found that the layer 16 was a perpendicular magnetization film having a good characteristic even when a 10 nm thick TbCo recording layer was formed on a 100 nm thick $Si_3N_4$ film. The thin film 16 had the improved Kerr hysteresis characteristic. This finding is important for practical application, and if a thin recording layer having a good characteristic can be formed, recording threshold power can be reduced and a Kerr enhancement effect can be improved. Since Faraday rotation of the laser beam transmitted through the recording layer can be superimposed on Kerr rotation, further improved carrier-to-noise ratio of the disk can be expected.

As described above, according to the present invention, there are provided a magneto-optical recording medium having a uniform composition in a direction of film thickness and an excellent Kerr hysteresis characteristic, and a method for manufacturing the same. Since the manufacturing method of the present invention can suppress heat load with respect to a substrate, a practical resin substrate can be used in the magneto-optical recording medium, and an industrially advantageous film forming method such as sputtering or deposition can be used. In order to realize the plasma surface treatment or the bias sputtering method in the present invention, since a means for applying power to the substrate is simply added, cost of a device for manufacturing disks can be as low as a conventional device.

According to the magneto-optical recording disk of the present invention, fused oxygen is decreased in the manufacturing process at least in the exposed surface portion of the interference layer 14, so that a content of a rare-earth element in the boundary region between the layers 16 and 14 is decreased below the average content thereof in the overall recording layer 16. The magneto-optical recording disk manufactured in accordance with this core concept has an improved Kerr hysteresis characteristic. In order to precisely demonstrate this, major data of experiments for confirming the characteristics conducted by the present inventors will be explained below.

FIG. 3A is a graph showing a distribution of an Auger peak intensity of components contained in the multilayered structure of the magneto-optical disk manufactured in accordance with the method of the present invention, including the step of stabilizing oxygen contained in an upper surface of the interference layer 14 by combining oxygen with Ar plasma ions (to be referred to as a plasma surface treatment step for oxygen stabilization hereinafter). Data of this graph is obtained when the electron beam is directly radiated on the recording layer 16 of the disk (without being transmitted through the substrate 12). A composition distribution was measured by Auger electron spectroscopy while the layer 16 was directly radiated with the electron beam and at the same time the layer 16 was etched by Ar ions. FIG. 3B shows results of the experiment in which the composition distribution in a direction of film thickness was measured for a magnetooptical disk manufactured without carrying out the plasma surface treatment step for oxygen stabilization (in other words, manufactured in accordance with the conventional method).

From a comparison between these graphs, the following facts can be easily learned. As can be seen from FIG. 3B, in the region 18 (indicated by arrow I in FIG. 3B) between the layers 14 and 16 of the conventional disk, a content curve of Tb as the rare-earth element (indicated by a broken curve in FIG. 3B) exhibits a peak (maximum) value. According to the conventional disk, the content of the rare-earth element in the region 18 is abnormally increased. In contrast to this, according to the disk of the present invention, a peak of a content curve of the rare-earth element in the region 18 is relatively moderate, as shown in FIG. 3A. Therefore, since a content of the rare-earth element in the layer 16 is relatively uniform, the layer 16 has a high uniformity. With the above experiment, when the "plasma surface treatment step for oxygen stabilization" included in the method of the present invention is used, it can be demonstrated that the magneto-optical recording medium explained with reference to FIG. 1 can be manufactured.

In order to confirm the effect of the abovementioned effect of the present invention (i.e., that a good Kerr hysteresis characteristic can be obtained), the present inventors conducted experiments wherein a series of samples to be described hereinafter was manufactured and Auger distribution and Kerr hysteresis characteristics of the samples were measured.

A plurality of samples were manufactured in accordance with the following process. First, three silicon substrates were prepared. Silicon nitride ($Si_3N_4$) films serving as interference layers were formed on the Si substrates to a thickness of 100 nm. Thereafter, the obtained structures were exposed to the outer atmosphere. One of these structure was arbitrarily selected, and was subjected to the plasma surface treatment step for oxygen stabilization according to the present invention (RF power: 100 W, self bias voltage: $-260$ V, interval: 5 min). The thus manufactured structure is named a sample A.

One of the remaining two substrates was arbitrarily selected. The selected structure was annealed in a nitrogen atmosphere at a temperature of 500° C. for 30 min. The thus obtained structure is identified as a sample B. The remaining Si substrate was exposed to the outer air in accordance with the conventional method without processing by any other process. The thus obtained structure is named a sample C. 100 nm thick TbCo films were formed on the samples A, B and C under the same conditions, and successively, 100 nm thick $Si_3N_4$ films were overcoated thereon.

Figure 4A:
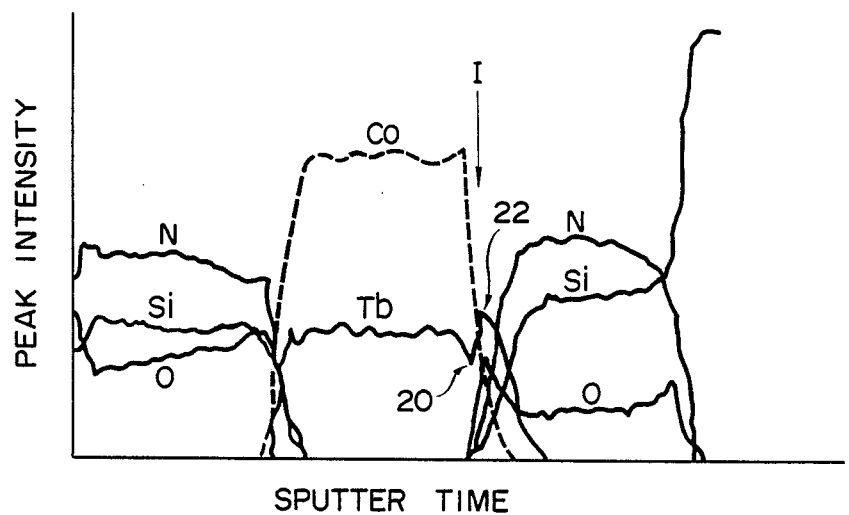
Figure 4B:
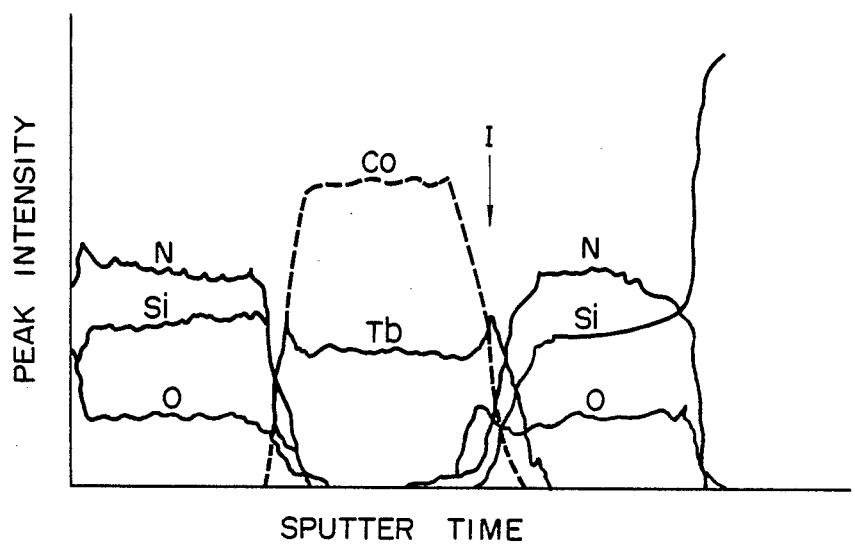

FIGS. 4A to 4C show results of Auger analysis conducted respectively for the samples A, B and C of the magneto-optical recording mediums formed by the above processes. According to the sample C formed by the conventional method and the sample B subjected to annealing, contents of Tb and O in the $Si_3N_4$ film are undesirably increased in the interface region between the TbCo film and the underlying $Si_3N_4$ film and its neighbouring portion, as shown in FIGS. 4B and 4C. In contrast to this, according to the sample A manufactured by the method of the present invention, a content of Tb is greatly decreased in the interface region between the TbCo film and the underlying $Si_3N_4$ film and its neighboring portion as compared to that in the TbCo film (see a Tb decrease curve indicated by reference numeral "20" in FIG. 4A), as shown in FIG. 4A. In particular, a "Tb increase curve" indicated by reference numeral "22" in FIG. 4A is caused by formation of Tb oxide formed by combination of oxygen adsorbed in the upper surface of the underlying $Si_3N_4$ film and Tb in the TbCo film.

FIGS. 5A to 5C show Kerr hysteresis loops of the samples A, B and C, respectively. Reference numerals in FIGS. 5A to 5C denote measurement values of a Kerr rotational angle. In each loop, the abscissa represents an external magnetic field H and the ordinate represents a magnetization Qk as in FIGS. 2A and 2B. Only the sample A formed by the method of the present invention has a good Kerr hysteresis loop approaching an ideal shape. The hysteresis loop of the sample B is inferior to that of the sample A. It becomes clear from FIG. 5C that the hysteresis loop of the sample C formed by the conventional method is worst.

FIGS. 6A and 6B are graphs showing infrared light absorption characteristics of the layer 14 formed on the disk of the present invention and on the conventional disk (i.e., the samples A and C). In these graphs, a change in absorption rate is plotted as a function of a change in frequency ($1/\lambda$) of the interference layer. As can be seen from FIG. 6B, the absorption rate of the interference layer of the conventional disk exhibits a main peak value P1 (absorption peak in terms of $Si_xO_yN_z$ phase) near $1/\lambda = 935$ cm$^{-1}$. On the other hand, as can be seen from FIG. 6A, in addition to the main peak value P1 near $1/\lambda = 935$ cm$^{-1}$, another peak value P2 (absorption peak in terms of $Si_xO_yN_z$ phase) is present near $1/\lambda = 1060$ cm$^{-1}$. The peak value P2 appears clearly separated from the peak value P1. It is assumed that appearance of the peak value P2 results from formation of SiO or $SiO_2$ in accordance with the stabilization of fused oxygen in the surface portion of the transparent thin film serving as the interference layer. Since oxygen contained in the surface portion of the transparent thin film is difficult to combine with a rare-earth element contained in the recording layer formed thereon, a content of the rare-earth element in obtaining a layer structure uniform in a direction of film thickness. It is considered that the oxygen supply source in the $Si_3N_4$ film is an oxide-based binder contained in a target.

In order to examine process conditions of the "plasma surface treatment" in more detail, the present inventors conducted the following experiments. FIGS. 7A to 7I show polar Kerr hysteresis loops of eight sample disks manufactured by varying the processing power of the "plasma surface treatment", i.e., bias voltage. In this case, Si substrates were employed for eight disk substrates. $Si_3N_4$ films were formed on the substrates to a thickness of 100 nm. After the $Si_3N_4$ films were formed, the substrates were exposed to air, and one of the substrates was placed in air in accordance with the conventional method. The plasma surface treatment was carried out on the remaining seven substrates with the $Si_3N_4$ films by varying the processing power (RF power). In this case, total time of plasma surface treatment was commonly set to be 5 minutes. Since another Si substrate without an interference layer was prepared as a comparative sample, the total number of samples was nine.

Thereafter, 100 nm thick magneto-optical recording layers comprising TbCo were formed on the nine substrate samples under the same conditions, and thereafter, 100 nm thick $Si_3N_4$ films were overcoated thereon. FIGS. 7A to 7I show the results of measurement of the Kerr hysteresis characteristic of the thus obtained samples. Note that the characteristic loop of FIG. 7A represents the Kerr hysteresis characteristic of the disk without the interference layer, and that of FIG. 7B represents the Kerr hysteresis characteristic of the disk manufactured without being subjected to the plasma surface treatment of the present invention. In addition, the characteristic loops of FIGS. 7C to 7I represent the Kerr hysteresis characteristic when the RF power is set to be 10 W, 25 W, 50 W, 70 W, 100 W, 300 W and 500 W using disks subjected to the plasma surface treatment of the present invention. The characteristic loops of FIGS. 7B to 7I show the polar Kerr hysteresis loops when the self bias voltage is set to be 0 V, $-50$ V, $-110$ V, $-175$ V, $-215$ V, $-270$ V, $-500$ V and $-660$ V, respectively.

Based upon these characteristic loops, the Kerr hysteresis characteristic shown in FIG. 7E has a preferred loop similar to an ideal rectangular loop having steep rising and falling edges. When the processing time is set to be constant, i.e., 5 minutes, the effect of the present invention begins to appear when the self bias voltage exceeds 120 V. In particular, it was demonstrated that a notable effect can be obtained when the self bias voltage exceeds 250 V. In practice, as described above, the disk substrate is formed not of silicon but of a resin material such as PMMA, polycarbonate (PC), epoxy or the like.

Figures 8A, 8B, 8C, 8D:
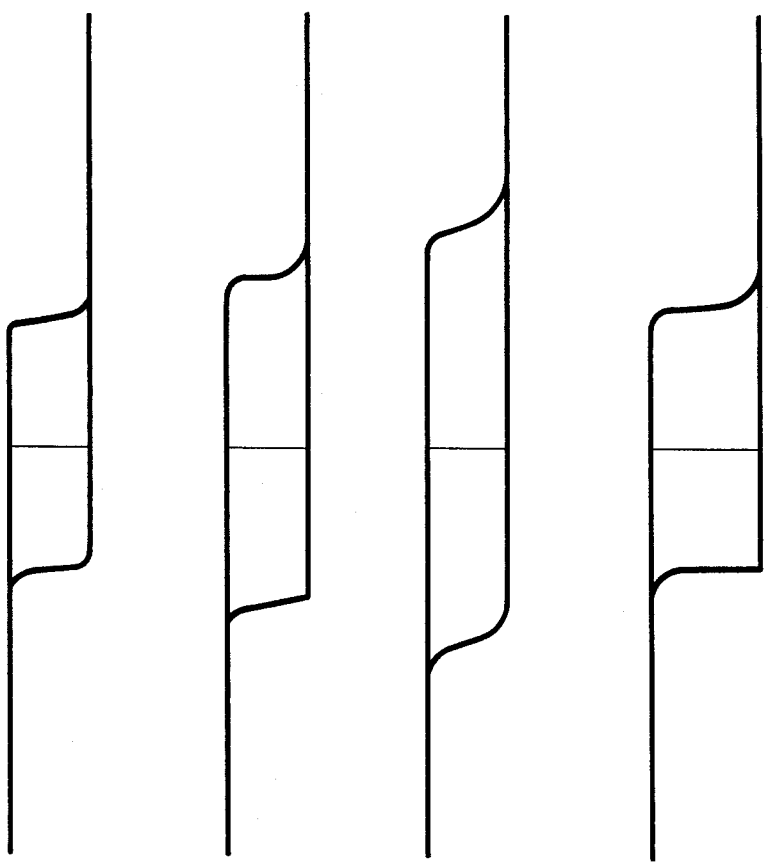
FIGS. 8A to 8D are graphs showing Kerr hysteresis loops of four samples of still another magneto-optical recording disk manufactured by varying a processing time period in the plasma surface treatment.

FIGS. 8A to 8D show the Kerr hysteresis loops of four samples of the magneto-optical disks manufactured by varying the treatment time of the "plasma surface treatment". Similarly, in this case, Si disk substrates were employed, and the self bias voltage and processing power were set constant, i.e., at $-250$ V and 250 W, respectively. The characteristic loop of FIG. 8A represents the Kerr hysteresis characteristic of the disk without the interference layer, and those of FIGS. 8B to 8D represent the Kerr hysteresis characteristics when the treatment time was set to be 1 min, 3 min and 5 min using disks subjected to the plasma surface treatment of the present invention. Based upon the results of the measurement, it was found that the proper plasma treatment time was 3 min or more and more preferably, 5 min or more.

The same experiment was conducted for a magnetooptical recording disk comprising a resin disk substrate and subjected to the plasma surface treatment of the present invention. In the plasma surface treatment of the present invention, even when high processing power of 300 W was applied to the substrate, and the treatment was performed for 5 min at a self bias voltage of $-500$ V, a PMMA substrate of low heat resistance could sufficiently withstand the surface treatment.

When the bias sputter-film forming method was adopted as the surface treatment step of the present invention and the processing power applied to the substrate was set to be 100 W, the PMMA substrate could thermally withstand continuous film forming process up to 10 min, and slight thermal deformation occurred after 15 minutes had elapsed. It was also confirmed that PC substrate could thermally withstand film forming process up to 30 min under the same conditions as described above. When a PMMA substrate is used, if the bias sputter-film formation is carried out while cooling the substrate, a 100 nm thick transparent thin film layer can be formed. Therefore, it was demonstrated that the manufacturing method of the present invention can be applied even when a practical resin substrate is used as the disk substrate.

Upper limits of power of the plasma surface treatment and a bias voltage in bias sputtering are determined by the temperature which the substrate can withstand, and vary depending upon materials of the substrate. Thus, the limits cannot be uniquely determined. In the case of the PMMA substrate, power, bias voltage and processing time of the plasma surface treatment are preferably set to be 500 W or lower, 700 V or lower and 10 min or less, and more preferably, 300 W or lower, 500 V or lower and 5 min, respectively. When an underlying layer is formed by bias sputtering, a bias voltage of the substrate is preferably set to be 250 V or lower and a continuous film forming time is preferably set to be 10 min or less. Thus, the present invention is more effective when a resin substrate to which plasma CVD or thermal CVD cannot be applied is used.

After a transparent thin film is formed by non-bias sputtering to a thickness smaller than a predetermined thickness, the remaining thickness of the transparent thin film can be formed by bias sputtering. Thus, a selection range of materials for the transparent thin film including those of low sputter rates can be widened.

When the method of manufacturing the magnetooptical recording medium including the surface treatment of the present invention is employed, an additional effect such as elongation of product life can also be obtained. In order to demonstrate this effect, the present inventors tested an accelerated degradation test with respect to a magneto-optical recording medium (e.g., a transparent thin film, a 100 nm thick TbCo layer and a 100 nm $Si_3N_4$ layer were successively formed on an Si substrate) manufactured by the method of the present invention. As a result, it was found that shift in magnetic composition of the recording layer of the disk of the present invention can be satisfactorily suppressed, and the Kerr hysteresis characteristic is almost unimpaired after the test.

Figure 9:
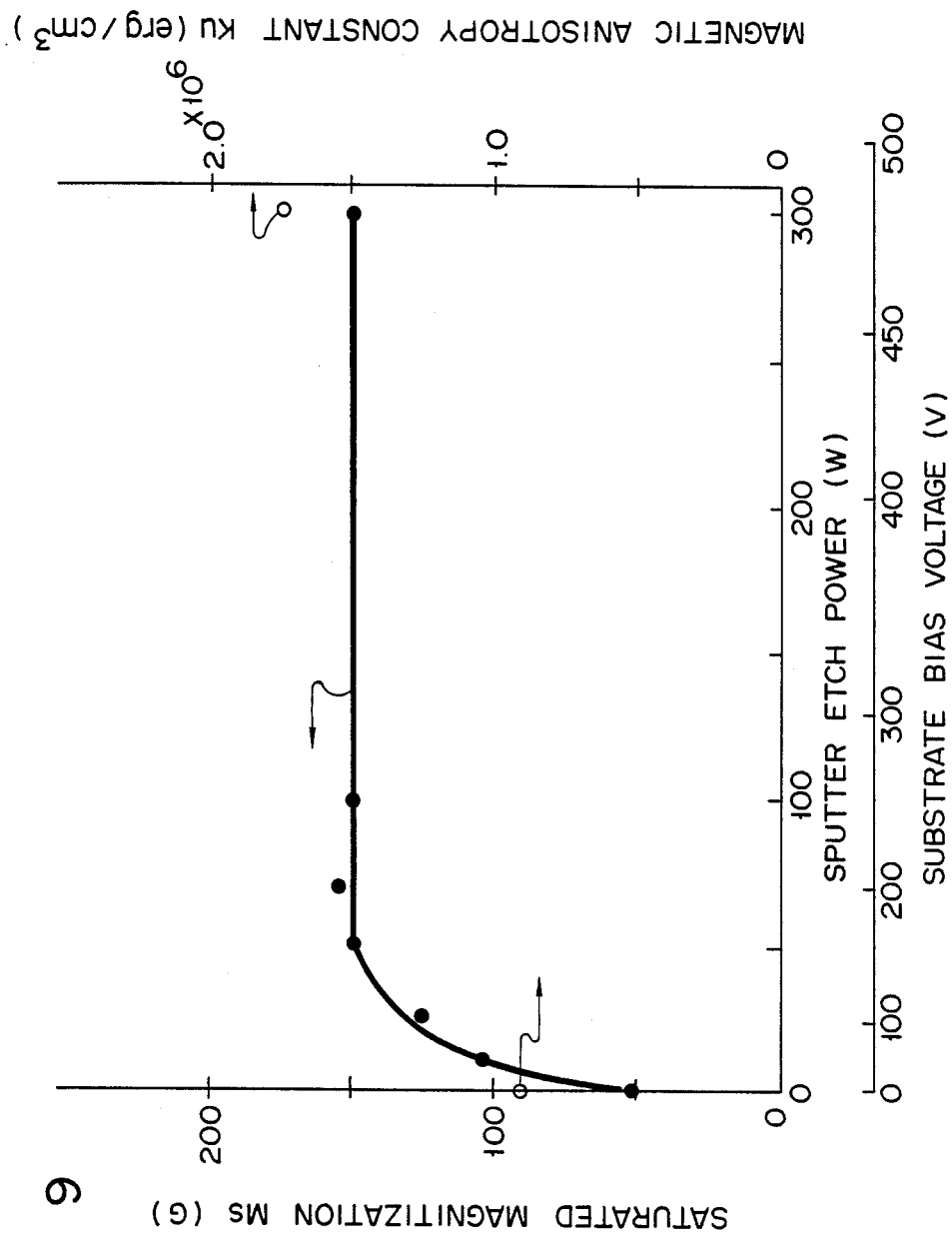
FIG. 9 is a graph showing a dependence of a perpendicular magnetic anisotropy constant Ku and a saturated magnetization Ms upon power of the plasma surface treatment of a sample of the magneto-optical recording disk in which a 100 nm thick $Si_3N_4$ film, a 100 nm thick TbCo recording layer and a 100 nm thick $Si_3N_4$ overcoating film are sequentially formed on an Si substrate.

FIG. 9 is a graph showing a distribution of saturated magnetization Ms and a perpendicular magnetic anisotropy constant Ku with respect to power of the plasma surface treatment of a sample of a magnetooptical recording disk in which a 100 nm thick $Si_3N_4$ film, a 100 nm thick TbCo recording layer and a 100 nm $Si_3N_4$ overcoating film are sequentially formed on an Si substrate. The saturated magnetization Ms and the perpendicular magnetic anisotropy constant Ku are calculated in accordance with the results of VSM and torque measurement. As can be seen from this graph, the perpendicular magnetic anisotropy constant Ku which is an important parameter when data is magnetically stored in the recording layer is stably increased to $1.5 \times 10^6$ erg/cm$^3$. Therefore, when the surface treatment of the present invention is performed, reliability of data storage in the recording layer can be improved.

Although the present invention has been shown and described with reference to particular embodiments, various changes and modifications which are obvious to a person skilled in the art to which the invention pertains are deemed to lie within the scope of the invention.

For example, an $Si_3N_4$ film is used as a transparent thin film. However, in addition to the $Si_3N_4$ film, an $SiO_2$ film, a $TiO_2$ film, an AlN film, a $C_2H_4$ plasma polymer film and the like can be used. As for the RE-TM film as the recording layer, in addition to the TbFe and TbCo films described in the above embodiment, a TbFeCo film, a GdTbFe film, a TbDyFe film, a GdDyFe film, a GdTbCo film, a GdTbFeCo film and the like can be used. It was confirmed that if any of these materials for the transparent thin film and the recording layer are used, the same effect as in the above embodiment can be obtained. Furthermore, in the above embodiment wherein the plasma surface treatment is carried out after the transparent thin film is formed, a sputtering method is used as a film forming method for the transparent thin film. However, the same effect of the present invention can be obtained if the transparent thin film is formed by a deposition method or by other film forming methods.

As for a magneto-optical recording medium having a transparent thin film formed by a method other than deposition as an underlying layer, the present invention was carried out for an $Si_3N_4$ film formed by an electron cyclotron resonance (ECR) plasma CVD method. The $Si_3N_4$ film was formed by ECR in such a manner that 20 sccm of $N_2$ and 25 sccm of $SiH_4$ were introduced into a reaction chamber as a reaction gas, and cyclotron resonance plasma was excited by application of 400 W microwave power and an external magnetic field while maintaining a total gas pressure at 2 mTorr. An Si substrate was used. When a 100 nm thick TbCo film and a 100 nm $Si_3N_4$ film were sequentially formed on an ECR-$Si_3N_4$ film by sputtering, a good Kerr loop could not be obtained. A good Kerr loop could be obtained only when the 100 nm thick TbCo film and the 100 nm $Si_3N_4$ film were sequentially formed by sputtering after the ECR-$Si_3N_4$ film was subjected to the plasma surface treatment of the present invention. In this manner, the film forming method of the underlying layer is not limited to the sputtering method, the deposition method and the like, and the same effect of the present invention can be obtained if the ECR method is used. For a transparent film such as an Si thermal oxide film having virtually no fused oxygen, a good Kerr loop can be obtained even if the plasma surface treatment of the present invention is not applied.

As for the film forming method of the recording layer, the deposition method can be used in place of the sputtering method.

Furthermore, as for the gas used in the plasma surface treatment of the substrate, the same effect can be obtained if an $H_2$ 10%-Ar gas mixture, $O_2$ 10% Ar gas mixture, N2 gas or the like is used instead of Ar. A reducing gas or an inert gas is preferable.

What is claimed is:

1. A method of manufacturing a magneto-optical recording medium comprising the steps of:

forming on a substrate a transparent thin film serving as an interface layer;

performing an oxygen depletion treatment process to decrease a content of oxygen which is contained in said transparent thin film layer and which is chemically combinable with other elements, said treatment process being carried out at a bias voltage which is sufficiently high to exclude chemically active oxygen contained within said thin film layer; and forming, after said oxygen depletion treatment process is complete, on said transparent thin film layer, a recording layer comprising an amorphous ferrimagnetic alloy thin film including a rare-earth-transition metal, wherein since formation of a rare-earth metal oxide is suppressed in a boundary region of the recording layer which contacts the transparent thin film layer, a content of the rare-earth metal is decreased in the interface region;

wherein said boundary region between said transparent thin film layer and said recording layer has a thickness which is not smaller than 1/10 of said recording layer.

2. The method according to claim 1, wherein, after said transparent thin film is formed on said substrate, said substrate is exposed in a plasma gas atmosphere, so that the oxygen contained in at least the surface portion of said transparent thin film is forcibly combined with plasma ions and is chemically stabilized, thereby suppressing formation of the rare-earth metal oxide in the boundary region between said transparent thin film and said recording layer when said recording layer is formed on said transparent thin film.

3. The method according to claim 2, wherein a voltage negative to the plasma ions is applied to said substrate while said substrate having said transparent thin film thereon is exposed in the plasma gas atmosphere.

4. The method according to claim 1, wherein, while said transparent thin film is being formed on said substrate, at least the surface portion of said transparent thin film is formed by bias sputtering, so that the oxygen contained in at least the surface portion of said transparent substrate is forcibly sputtered out so as to decrease an oxygen content in the surface portion, thereby suppressing formation of the rare-earth metal oxide in the boundary region between said transparent thin film and said recording layer when said recording layer is formed on said transparent thin film.

5. The method according to claim 3, wherein a sputter voltage of −120 to −700 volts is applied to said substrate.

6. The recording medium according to claim 5 wherein, after a part of said transparent thin film is formed on said substrate by non-bias sputtering, the other part of said transparent thin film is formed by bias sputtering, and wherein the bias sputter step is sufficiently performed so as to sputter oxygen contained in the other part of said transparent thin film.

7. The method according to claim 1, wherein said surface treatment process comprises:
plasma surface treatment for forcibly combining the oxygen contained in the exposed surface portion of said transparent thin film layer with another element thereby to chemically stabilize at least the exposed surface of said transparent thin film layer.

8. The method according to claim 1, wherein said surface treatment process comprises:
sputtering surface treatment for sputtering out the oxygen contained in the exposed surface portion of said transparent thin film layer, thereby to chemically stabilize at least the exposed surface of said transparent thin film layer.

9. The method according to claim 8, wherein said sputtering surface treatment comprises a bias sputtering process.

10. The method according to claim 1, wherein the content of a rare-earth metal is decreased by said surface treatment process to have a content ration which is equal to or smaller than 2 atomic percent.

11. The method according to claim 1, wherein said oxygen depletion treatment process is carried out at a bias voltage of 120 volts or more.

12. The method according to claim 11, wherein said bias voltage is set to 250 volts or more.

13. The method according to claim 11, wherein said oxygen depletion treatment process is carried out sufficiently long to exclude chemically active oxygen contained within said thin film layer.

14. The method according to claim 13, wherein said oxygen depletion treatment process is carried out for 3 minutes or more.

* * * * *